(12) United States Patent
Rose et al.

(10) Patent No.: US 7,878,535 B2
(45) Date of Patent: Feb. 1, 2011

(54) AIRBAG INFLATOR WITH ADAPTIVE VALVE

(75) Inventors: James Michael Rose, Knoxville, TN (US); Cornelia Jane Quimby, Knoxville, TN (US); Todd Steven Carlson, Knoxville, TN (US); Stephen C. Gold, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 156 days.

(21) Appl. No.: 12/149,262

(22) Filed: Apr. 29, 2008

(65) Prior Publication Data

US 2009/0267334 A1 Oct. 29, 2009

(51) Int. Cl.
B60R 21/26 (2006.01)
(52) U.S. Cl. ...................................... 280/736
(58) Field of Classification Search ................. 280/736, 280/741, 737, 739, 740; 102/530, 531; 137/68.13
See application file for complete search history.

(56) References Cited

U.S. PATENT DOCUMENTS

| | | | |
|---|---|---|---|
| 5,195,777 A | 3/1993 | Cuevas | |
| 5,531,473 A | 7/1996 | Rink et al. | |
| 5,669,629 A | 9/1997 | Rink | |
| 5,820,162 A | 10/1998 | Fink | |
| 5,970,880 A | 10/1999 | Perotto | |
| 6,022,045 A | 2/2000 | Faigle | |
| 6,086,094 A | 7/2000 | Stevens et al. | |
| 6,123,358 A | 9/2000 | Ryan et al. | |
| 6,142,514 A | 11/2000 | Yamato et al. | |
| 6,196,582 B1 | 3/2001 | Sparkman et al. | |
| 6,203,061 B1 | 3/2001 | Niederman et al. | |
| 6,227,562 B1 | 5/2001 | Shirk et al. | |
| 6,231,075 B1 | 5/2001 | Otsu | |
| 6,314,889 B1* | 11/2001 | Smith | 102/530 |
| 6,431,596 B1 | 8/2002 | Ryan et al. | |
| 6,557,890 B1* | 5/2003 | Karlin et al. | 280/741 |
| 6,572,143 B2 | 6/2003 | Yamato et al. | |
| 6,669,231 B2 | 12/2003 | Ryan | |
| 6,918,611 B1 | 7/2005 | Winters et al. | |
| 6,966,578 B2* | 11/2005 | Smith | 280/736 |
| 6,976,704 B2 | 12/2005 | Lewis et al. | |
| 7,055,857 B2 | 6/2006 | Marotzke | |
| 7,325,829 B2* | 2/2008 | Kelley et al. | 280/736 |
| 7,341,276 B2* | 3/2008 | Kelley et al. | 280/736 |
| 2004/0000777 A1* | 1/2004 | Meduvsky et al. | 280/742 |
| 2005/0098988 A1 | 5/2005 | Smith | |

(Continued)

Primary Examiner—Paul N Dickson
Assistant Examiner—Joseph Rocca
(74) Attorney, Agent, or Firm—Nixon & Vanderhye PC

(57) ABSTRACT

An adaptive valve for an airbag inflator having a manifold with an exhaust opening for fluid communication with an airbag. The adaptive valve is constructed for connection to a manifold so that it is in fluid communication therewith. The adaptive valve has an exhaust orifice and is constructed to selectively open the exhaust orifice to divert inflation gas away from an inflator manifold when it is connected thereto to lower the rate of inflation of an airbag in fluid communication with the exhaust opening of the manifold. The adaptive valve may have a valve member movably mounted therein for movement between a first position wherein it closes the exhaust orifice and a second position wherein it opens the exhaust orifice. An initiator is provided in the adaptive valve to generate sufficient gas pressure to move the valve member to the first or second position.

14 Claims, 12 Drawing Sheets

U.S. PATENT DOCUMENTS

| | | |
|---|---|---|
| 2005/0179240 A1 | 8/2005 | Duvacquier et al. |
| 2006/0202457 A1* | 9/2006 | Patterson .................... 280/740 |
| 2007/0075534 A1* | 4/2007 | Kelley et al. ............... 280/736 |
| 2007/0085311 A1* | 4/2007 | Hofmann et al. ............ 280/739 |
| 2007/0228013 A1* | 10/2007 | Stevens et al. ................ 218/1 |
| 2008/0111359 A1* | 5/2008 | Abaziou ..................... 280/741 |
| 2009/0020990 A1* | 1/2009 | Townsend et al. ........... 280/737 |

* cited by examiner

AIRBAG INFLATOR WITH ADAPTIVE VALVE

CROSS-REFERENCES TO RELATED APPLICATIONS

N/A

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The present invention relates to an inflator for a vehicle airbag or the like and, more particularly, to such an inflator having an adaptive valve for selectively diverting gas away from the airbag to lower the rate of inflation thereof.

2. Description of the Background Art

Varied or staged output levels have been used to deploy a vehicle airbag based on occupant need, severity of the crash and vehicle conditions. Generally, this type of airbag deployment uses a dual-stage inflator that can discharge a predetermined amount of gas at one or more levels. While such constructions have generally served their intended purpose, they have been complicated in construction, difficult to manufacture and thus more expensive to manufacture. Also, such inflator constructions are subject to variation because the operating pressure varies with changes in output levels.

The new and improved airbag inflator of the present invention is not subject to the above described disadvantages of the present dual-stage inflators and possess advantages not found in the present dual-stage inflators.

BRIEF SUMMARY OF THE INVENTION

In the new and improved airbag inflator of the present invention, inflation gas is diverted away from the airbag using an adaptive valve that is attached to or formed as a part of the inflator. The valve can either initiate gas diversion away from the airbag (reverse logic valve) or can stop diversion away from the airbag (forward logic valve). Since the adaptive valve can be functioned at any time during the inflation of the airbag, the amount of gas entering the airbag can be easily selectively varied.

The adaptive valve is attached to or formed as a part of the exhaust or manifold end of a single level inflator. The manifold has exhaust opening that are in fluid communication with the airbag, and thus inflation gas that flows out of the manifold openings enters the airbag to inflate it. The adaptive valve is in direct fluid communication with the manifold and is provided with exhaust orifices that are not in fluid communication with the airbag, and thus can divert inflation gas into the vehicle passenger cabin directly to selectively lower the rate of inflation of the airbag.

In operation, the application of an electrical current to an inflator initiator causes ignition of a booster-enhancer pyrotechnic material which in turn causes ignition of pyrotechnic generant material in the inflator housing. The heat and gas generated from the ignited pyrotechnic material, along with any stored gas in the inflator housing, combine to increase the internal pressure in the inflator housing to a predetermined level to rupture a burst disk disposed in a control orifice between the inflator housing and the exhaust manifold. The inflation gas then flows into the exhaust manifold and into the airbag to inflate it. The adaptive valve is attached to or formed as a part of the exhaust manifold and is in direct fluid communication with the exhaust manifold such that it is pressurized therewith by the inflator gas. The adaptive valve is provided with exhaust orifices that can be selectively opened to the inflator gas therein to divert gas away from the airbag and into the vehicle passenger cabin directly, the instrument panel or vehicle exterior to lower the rate of inflation of the airbag.

DETAILED DESCRIPTION OF THE INVENTION

Figure 1:
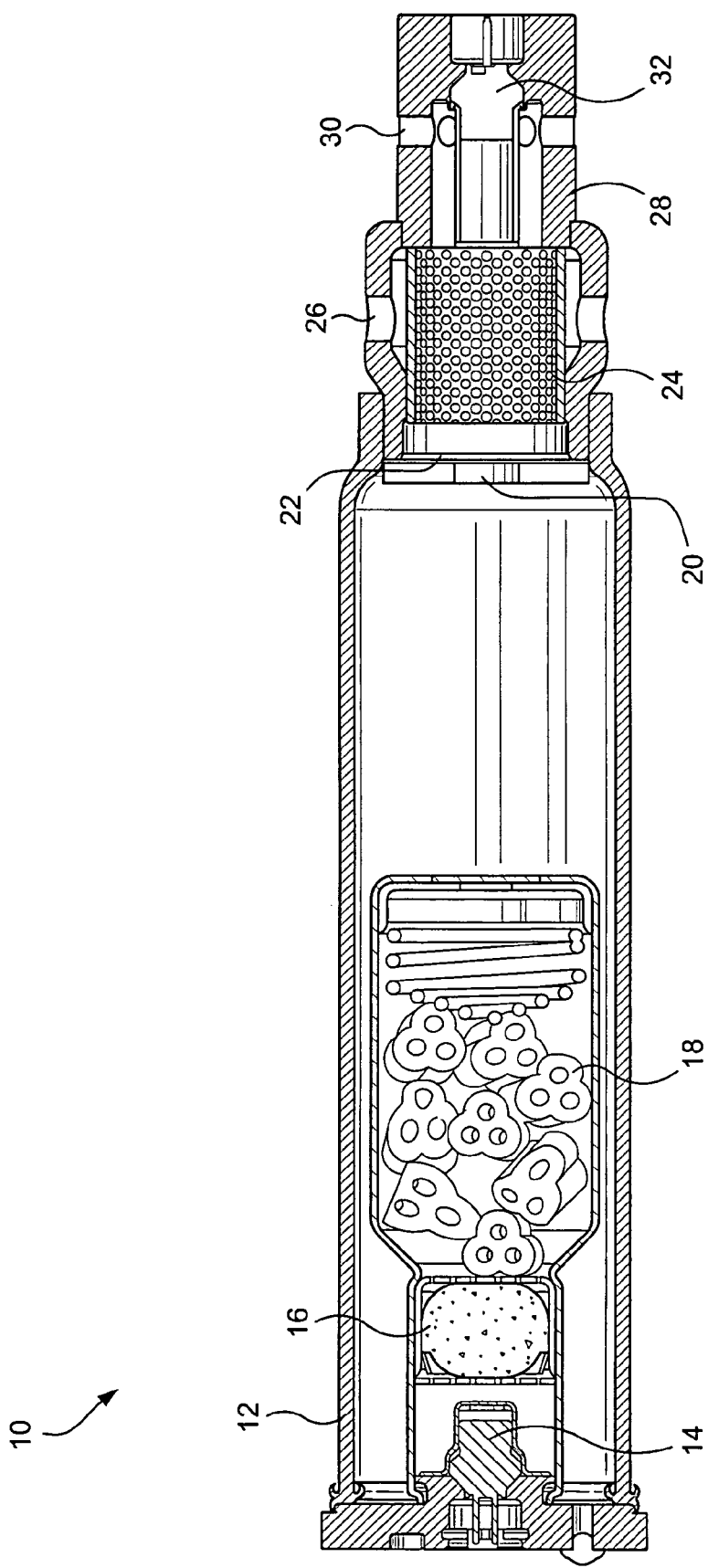
FIG. 1 is a side elevational view, with parts broken away and in section, of an airbag inflator having an exhaust manifold and an adaptive valve connected to or formed as part of the exhaust manifold and constructed in accordance with the principles of the present invention.

FIG. 1 illustrates an inflator 10 for an airbag or the like having a pressure vessel or housing 12, an inflator initiator 14 at one end of the housing 12 a booster/enhancer pyrotechnic material 16 disposed adjacent to the inflator initiator 14, and a gas generant 18 disposed adjacent to the booster enhancer 16. The opposite or exhaust end of the pressure vessel 12 has a control orifice 20 closed by a rupture disk 22 that is disposed adjacent to an inflator manifold 24 that is connected to or formed as a part of the pressure vessel 12. The manifold 24 is provided with a plurality of exhaust openings 26 that are positioned to be connected to the airbag (not shown) for the inflation thereof.

An adaptive valve 28 formed in accordance with the principles of the present invention is connected to or formed as a part of the manifold 24 and is provided with a plurality of exhaust orifices 30 and an adaptive valve initiator 32 for a purpose to be described hereinafter. The detailed construction of the adaptive valve 28 is not shown in FIG. 1 and is shown in different embodiments in FIGS. 2a, 2b, 2c, 3a, 3b, 3c, 4a, 4b, 5a, 5b and 6.

Figure 2A:
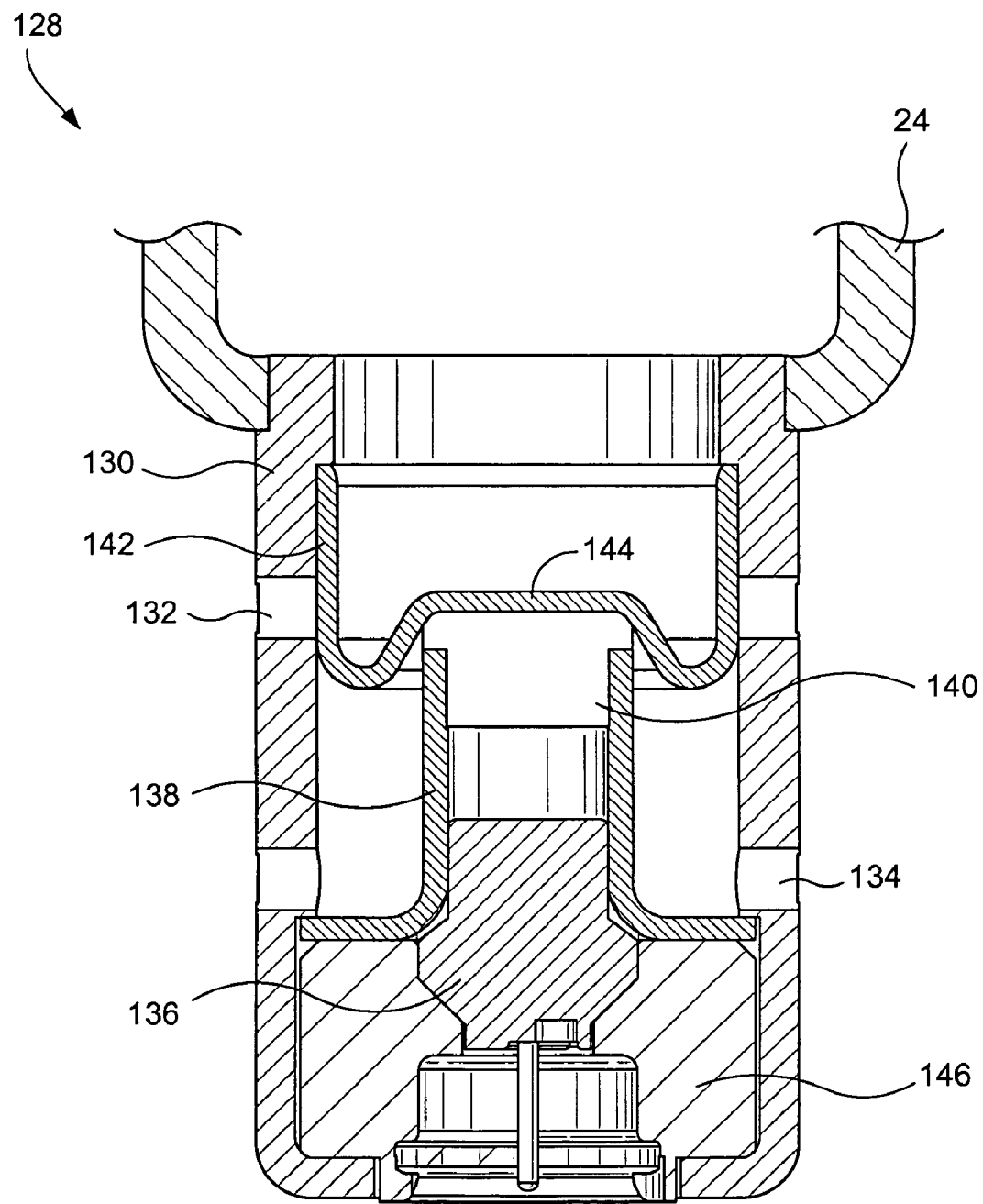
FIG. 2a is a side elevational view of a first embodiment of an adaptive valve for the inflator shown in FIG. 1, wherein the exhaust orifices of the adaptive valve are closed.
Figure 2B:
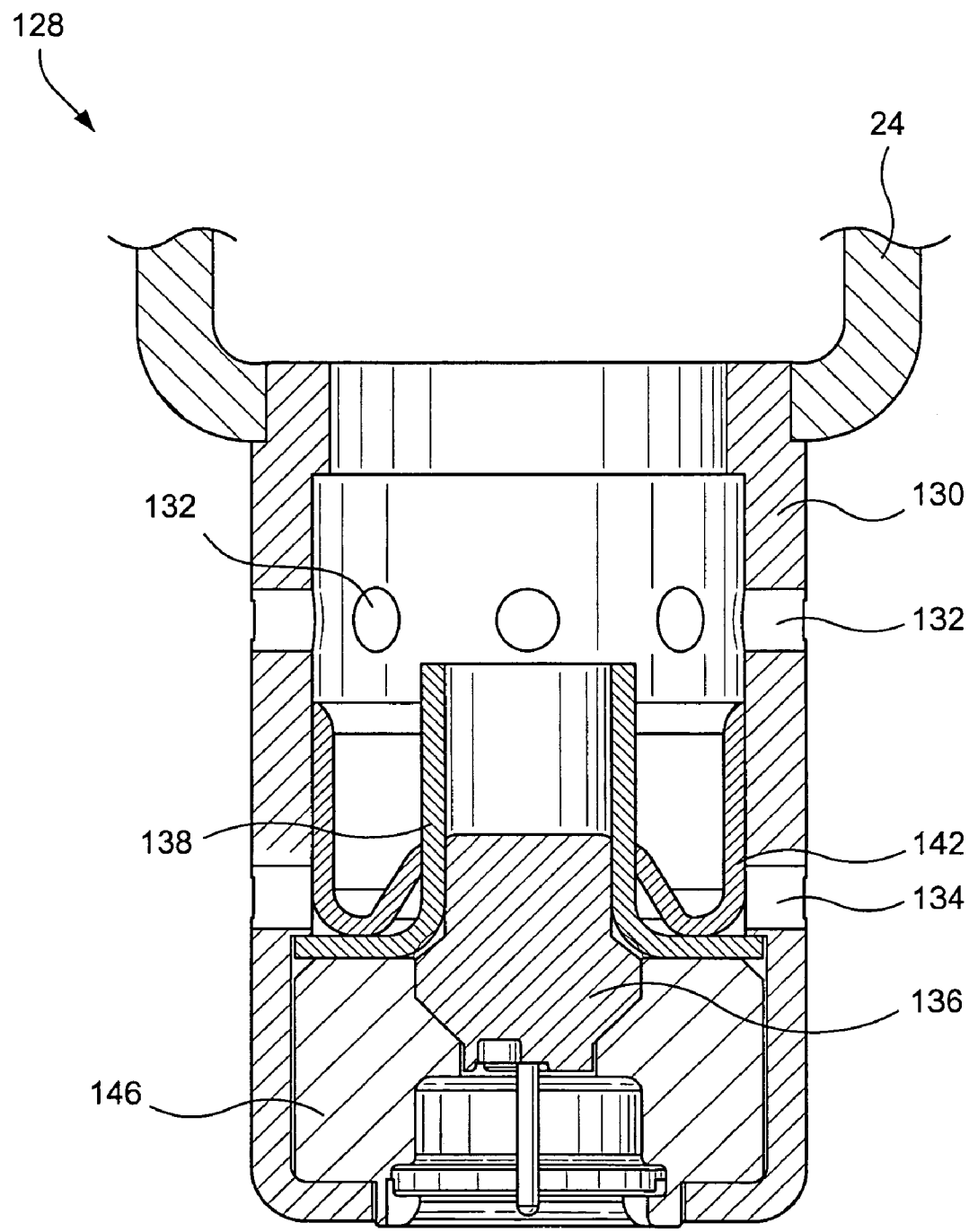
FIG. 2b is a view similar to FIG. 2a wherein the exhaust orifices of the adaptive valve are open to divert gas away from the airbag.

FIGS. 2a and 2b disclose a first embodiment of a reverse logic adaptive valve 128 having a valve body 130 with a plurality of exhaust orifices 132 and air vents 134. The valve body has an open end for connection to an inflator exhaust manifold (not shown) as illustrated in FIG. 1, and a closed outer end having an initiator 136 and initiator support 146 of any suitable type mounted therein. The inner end of the initiator 136 is surrounded by a generally cylindrical valve member support 138 fixedly mounted within the valve body 130. The inner end of the support 138 is closed by a support plug 140 that is removably mounted therein, and a cup-like valve member 142 is slidably mounted within the valve body 130 and has an indented and weakened central portion 144 that is in engagement with the support plug 140.

In the operation of the inflator 10 with the adaptive valve 128 shown in FIGS. 2a and 2b, upon activation of the inflator 10 by the ignition of the gas generant 18 in the pressure vessel 12, the rupture disk 22 is opened to allow the generated gas along with any other stored gas in the pressure vessel to flow through the control orifice 20 and into the exhaust manifold 24 and the valve body 130 of the adaptive valve 128. The gas pressure in the valve body 130 forces the central portion 144 of the cup-like valve member 142 into engagement with the support plug 140 such that the valve exhaust orifices 132 remain closed so that none of the inflation gas is diverted away from the exhaust manifold 24, thereby resulting in a high rate of inflation of the airbag.

When it is desired to reduce the rate of inflation of the airbag, the valve initiator 136 is activated to increase the gas pressure in the support 138 which causes the support plug 140 to cut through and open the central portion 144 of the valve member 142. The inflation gas pressure in the valve body 130 then causes the valve member 142 to move along the support 138 to the outer position shown in FIG. 2b wherein the valve exhaust orifices 132 are uncovered to divert some of the inflation gas away from the exhaust manifold and the airbag, and into the vehicle passenger cabin directly, the instrument panel or the vehicle exterior to thereby lower the rate of inflation of the airbag.

Any air trapped between the valve member 142 and the initiator support 146 is vented to the atmosphere through the air vent holes 134 in the valve body 130. The air vent holes 134 also provide a vent for any inflator gas that leaks past the valve member 142 such that pressure cannot build up on the outer end of the valve member 142 to hinder movement thereof.

Figure 2C:
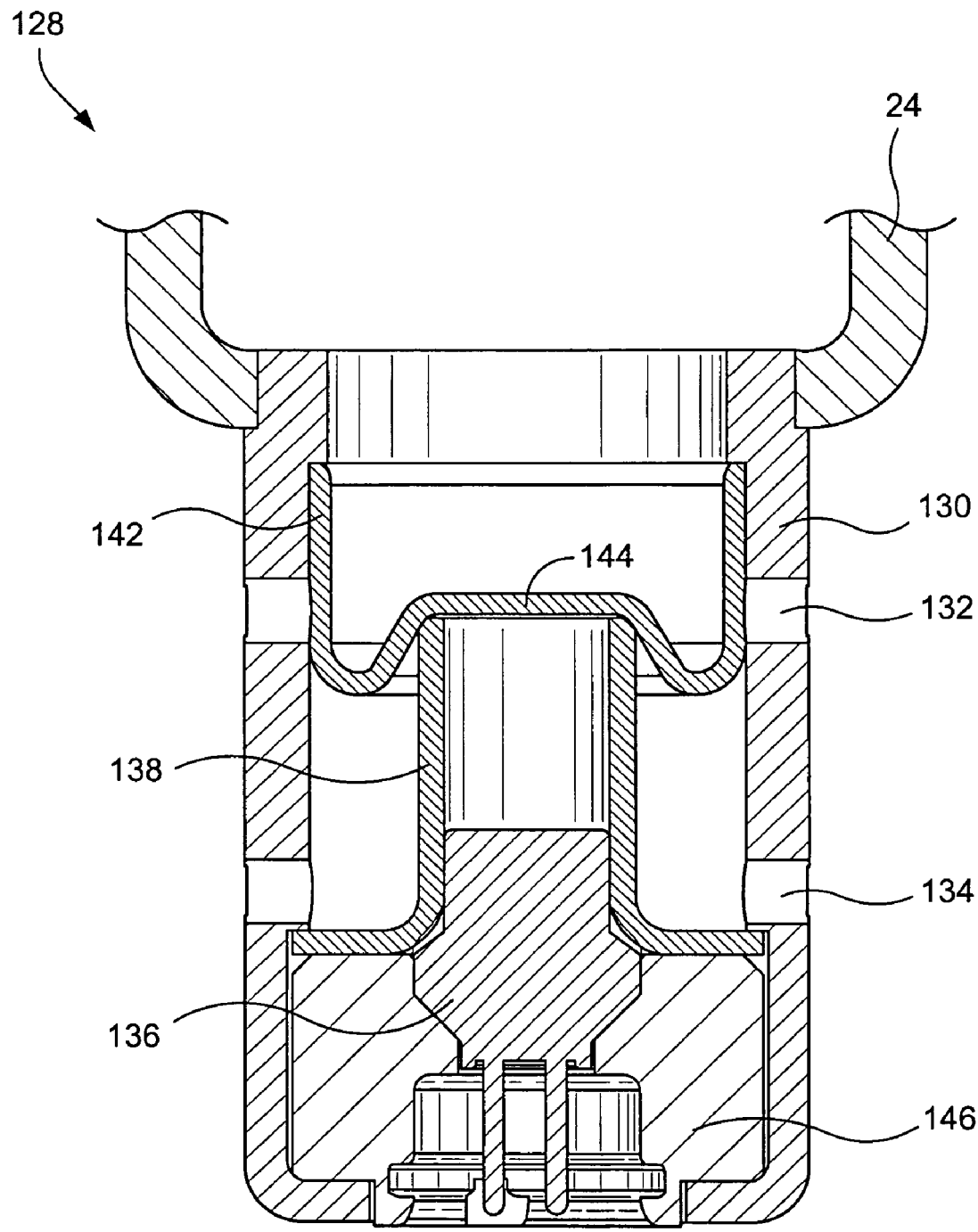
FIG. 2c is a view similar to FIG. 2a showing a modified adaptive valve construction.

An alternate embodiment of the adaptive valve 128 is shown in FIG. 2c wherein the support plug 140 is omitted and the central portion 144 of the valve member 142 rests directly on the inner end of the support 138. The central portion 144 of the valve member 142 is weakened in any suitable manner such that the pressure created by the activation of the valve initiator 136 will open the central portion 144 and allow the valve member 142 to move to the open or outer position shown in FIG. 2b wherein the valve exhaust orifices 132 are open.

Figure 3A:
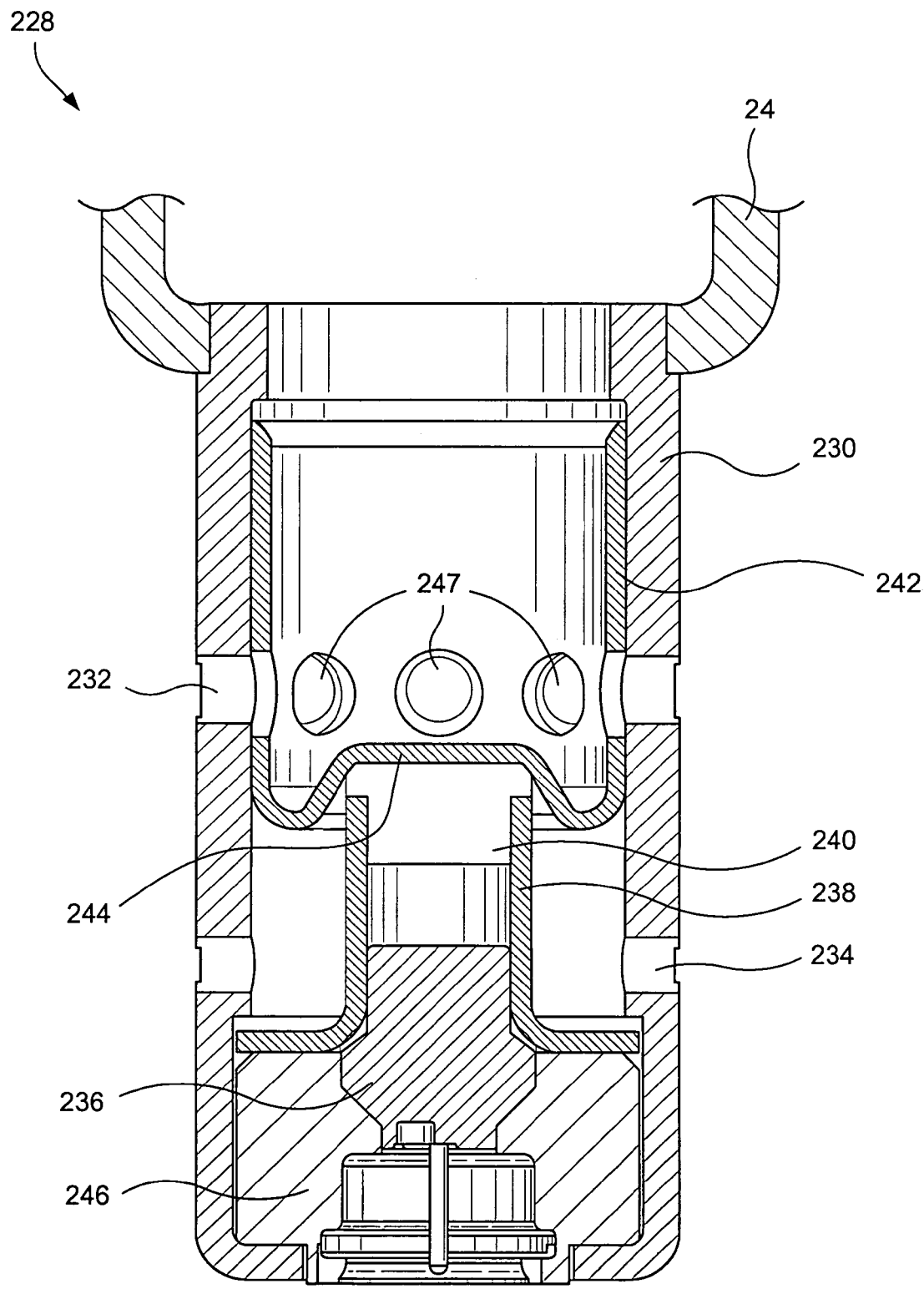
FIG. 3a is a side elevational view, with parts broken away and in section, of a second embodiment of an adaptive valve for the inflator of FIG. 1, wherein the exhaust orifices of the adaptive valve are open.
Figure 3B:
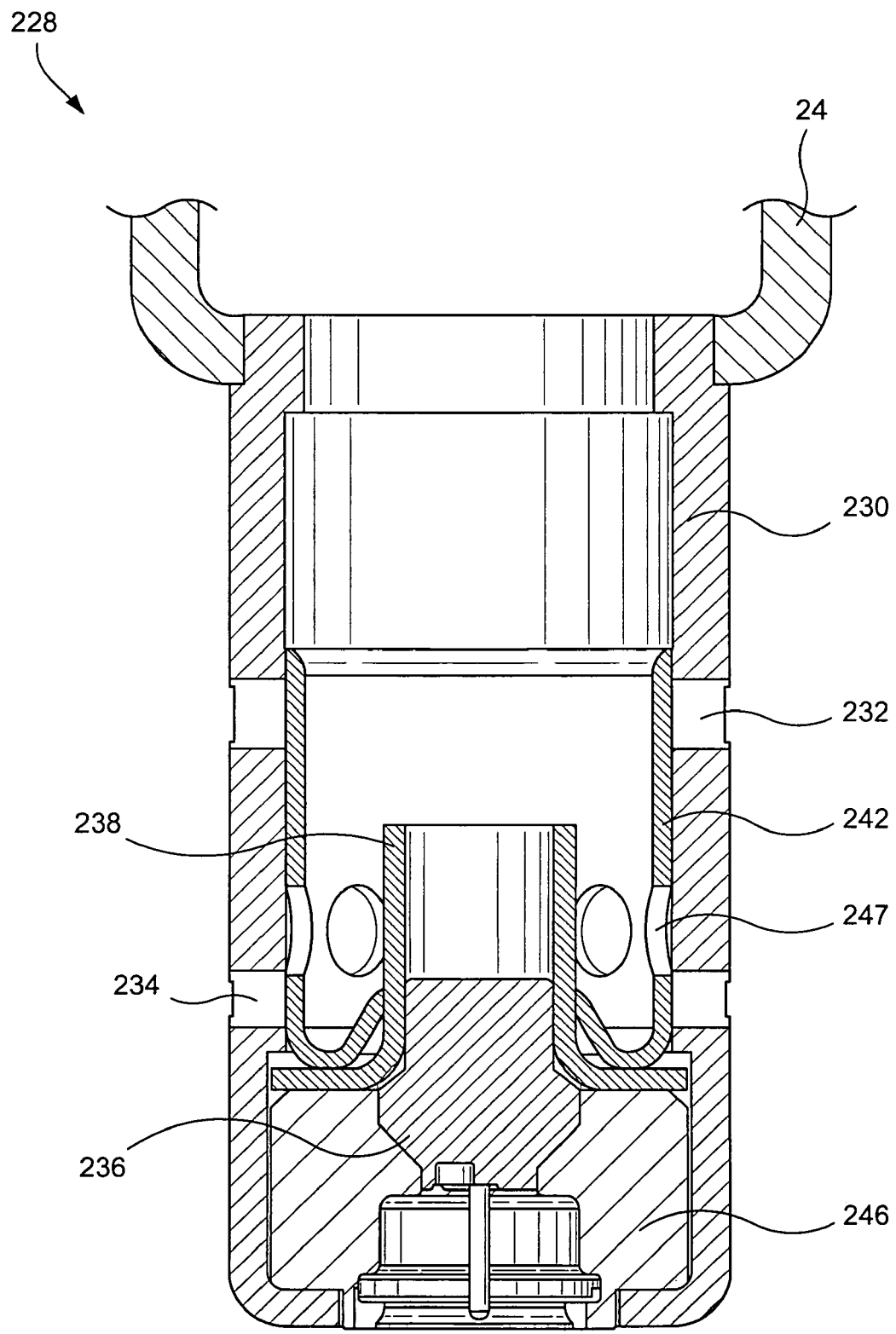
FIG. 3b is a side elevational view similar to FIG. 3a wherein the exhaust orifices of the adaptive valve are closed.

FIGS. 3a and 3b illustrate a second embodiment of an adaptive valve 228 that is similar in construction and operation to the valve 128 shown in FIGS. 2a and 2b, with the exception that the valve 228 is a forward logic type valve. The adaptive valve 228 comprises a valve body 230 having a plurality of exhaust orifices 232 and air vents 234. The outer end of the valve body 230 is closed by an initiator support 246 and an initiator 236. The inner portion of the initiator 236 is surrounded by a cylindrical support 238 that is closed at its inner end by a support plug 240 that is removably mounted therein. A cup-like valve member 242 is slidably mounted in the valve body 230 and has an indented and weakened central portion 244 that rests on the support plug 240 when the valve member 242 is in its normally open position wherein the openings 247 therein are aligned with the exhaust orifices 232, as shown in FIG. 3a.

In the normally open position shown in FIG. 3a, pressurized inflation gas in the exhaust manifold 24 and the valve body 230 is diverted through the openings 247 in the valve member 242 and through the exhaust orifices 232 away from the airbag and into the vehicle passenger cabin or the instrument panel (not shown) directly, or to the vehicle exterior. Accordingly, the airbag is inflated at a lower rate because of the diversion of pressurized inflation gas through the valve exhaust orifices 232. When it is desired to increase the inflation rate of the airbag, the initiator 236 is activated to create enough gas pressure to move the support plug 240 through the center portion 244 of the valve member 242 which then enables the valve member 242 to be moved by the inflation gas pressure in the exhaust manifold and the inner end of the valve body 230 to the closed position shown in FIG. 3b wherein the valve member openings 247 are moved out of alignment with the exhaust orifices 232 which are closed by the valve member 242 such that no inflation gas is diverted away from the exhaust manifold 24 and the airbag such that the airbag is inflated at a more rapid rate.

The air vents 234 serve the same purpose in the adaptive valve 228 as the air vents 134 in the adaptive valve 128 shown in FIGS. 2a and 2b.

Figure 3C:
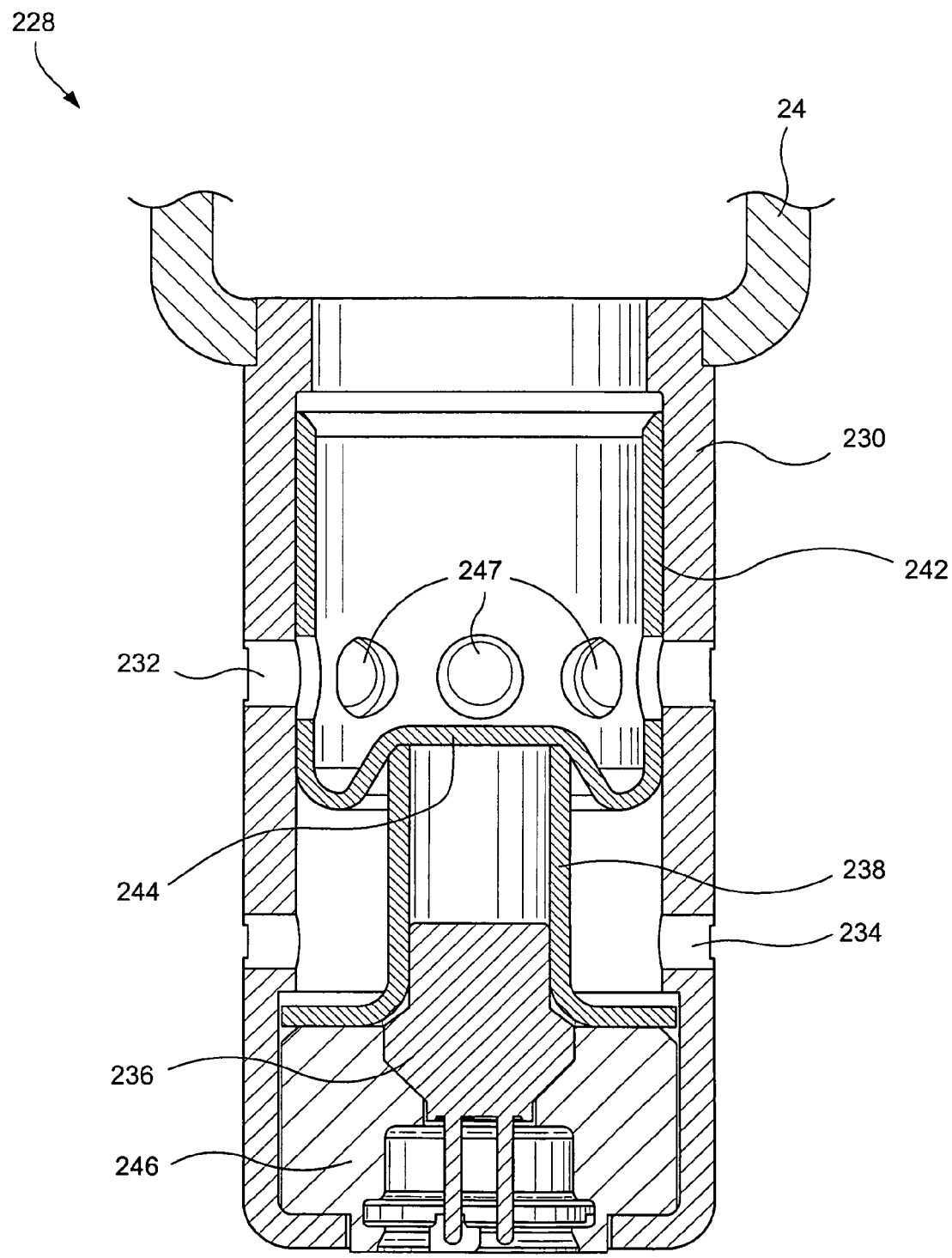
FIG. 3c is a view similar to FIG. 3a showing a modified adaptive valve construction.

An alternate embodiment of the adaptive valve 228 is shown in FIG. 3c wherein the support plug 240 is omitted and the central portion 244 of the valve member 242 rests directly on the inner end of the valve member support 238. When the initiator 236 is activated, the gas pressure created in the valve member support 238 opens the weakened central portion 244 of the valve member 242 to enable it to be moved from the normally open position to the closed position shown in FIG. 3b.

Figure 4A:
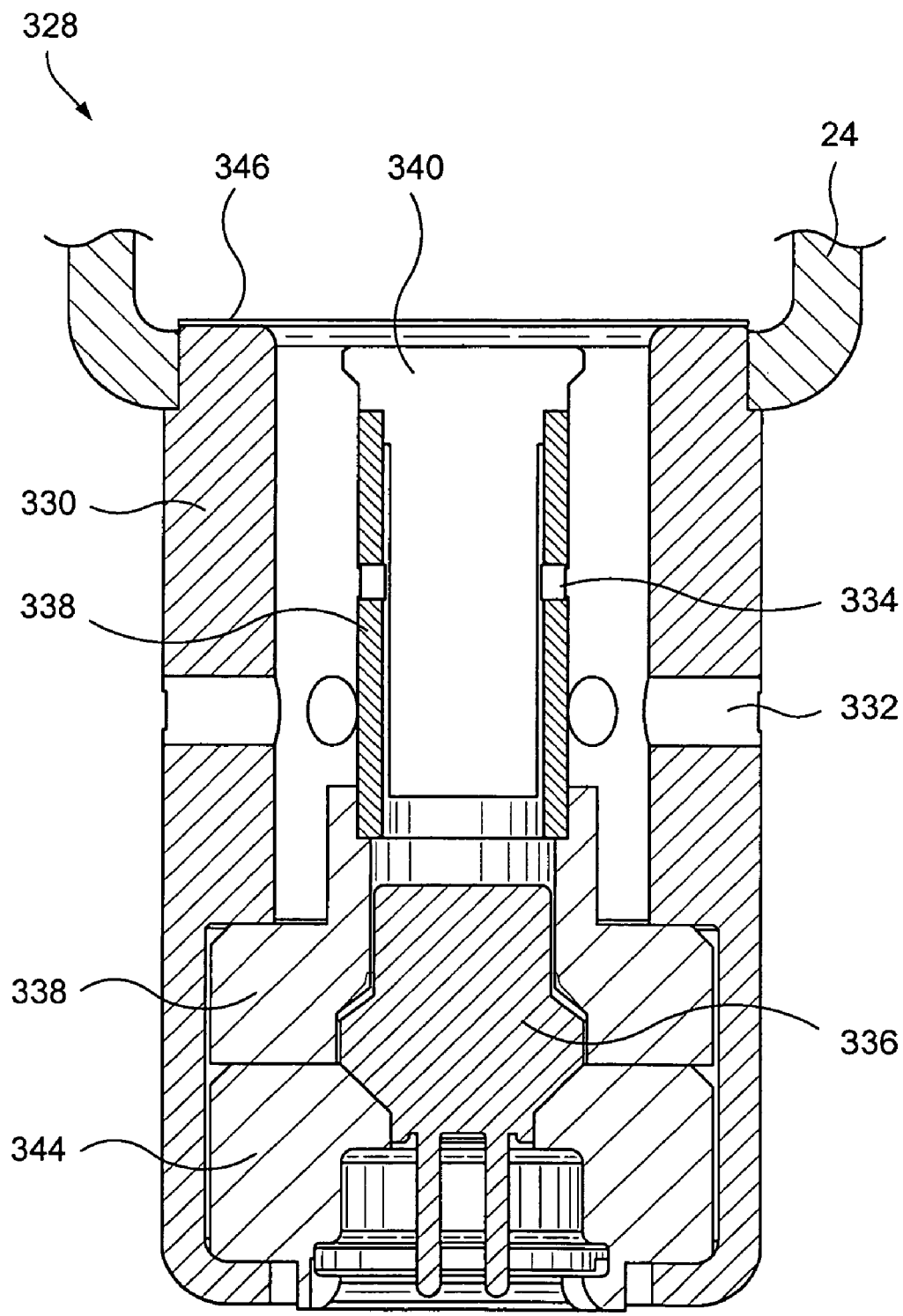
FIG. 4a is a side elevational view, with parts broken away and in section, of a third embodiment of an adaptive valve for use with the inflator of FIG. 1, wherein the valve exhaust orifices are closed to the inflation gas in the exhaust manifold.

FIG. 4a illustrates a third embodiment of an adaptive valve 328 that is of the reverse logic type that is in a normally closed position. The adaptive valve 328 comprises a valve body 330 having a plurality of exhaust orifices 332. The outer end of the valve body 330 is closed by an initiator support 344 and an initiator 336 which is surrounded at its upper end by the lower portion of a support tube 338 disposed within the valve body 330. The inner, narrower portion of the support tube 338 has a support plug 340 movably mounted therein and closing the inner end thereof. The inner open end of the valve body 330 adjacent to the exhaust manifold 24 is closed by a rupture disk 346 that rests on the inner end of the support plug 340. The inner narrower portion of the support tube 338 has vent openings 334 therein.

In the normally closed position shown in FIG. 4a, the adaptive valve 328 does not divert any inflation gas under pressure from the exhaust manifold 24 such that the airbag is inflated at a high level or rate. When it is desired to decrease the rate of inflation of the airbag, the initiator 336 is activated to create sufficient inflation gas pressure to move the support plug 340 through the rupture disk 346 such that pressurized inflation gas can flow from the exhaust manifold 24 around the inner portion of the support tube and through the exhaust orifices 332. The support tube vents 334 are located approximately half way between the inner end of the support tube and the bottom of the support plug 340. After the support plug 340 cuts through the rupture disk 346, the plug 340 moves inwardly until the vents 334 are uncovered to eliminate the driving pressure moving the plug 340. The higher pressure on the inner end of the support plug 340 then moves the support plug back to the position shown in FIG. 4*a* which does not cause any restriction of gas flow through the opening in the rupture disk 346.

Figure 4B:
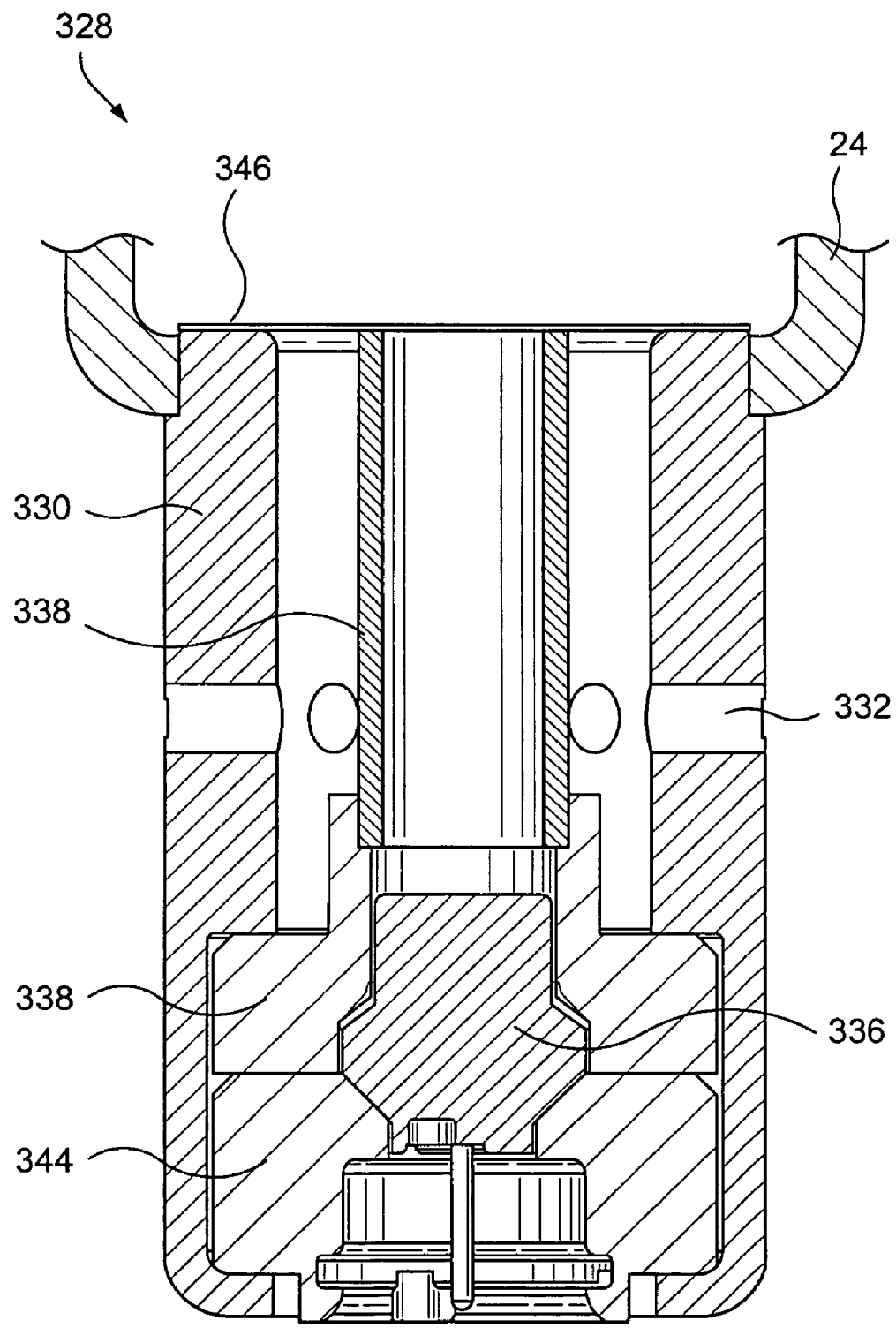
FIG. 4b is a side elevational view similar to FIG. 4a showing a modified adaptive valve construction.

An alternate embodiment of the adaptive valve 328 is shown in FIG. 4*b* wherein the support plug 340 and support tube vents 334 are omitted and the rupture disk 346 rests on and is supported by the inner end of the support tube 338. In this embodiment, when the initiator 336 is activated to increase the gas pressure within the support tube 338, the rupture disk 346 is ruptured or open to enable pressurized inflation gas to flow from exhaust manifold 24 through the exhaust orifices 332 to lower the rate of inflation of the airbag.

Figure 5A:
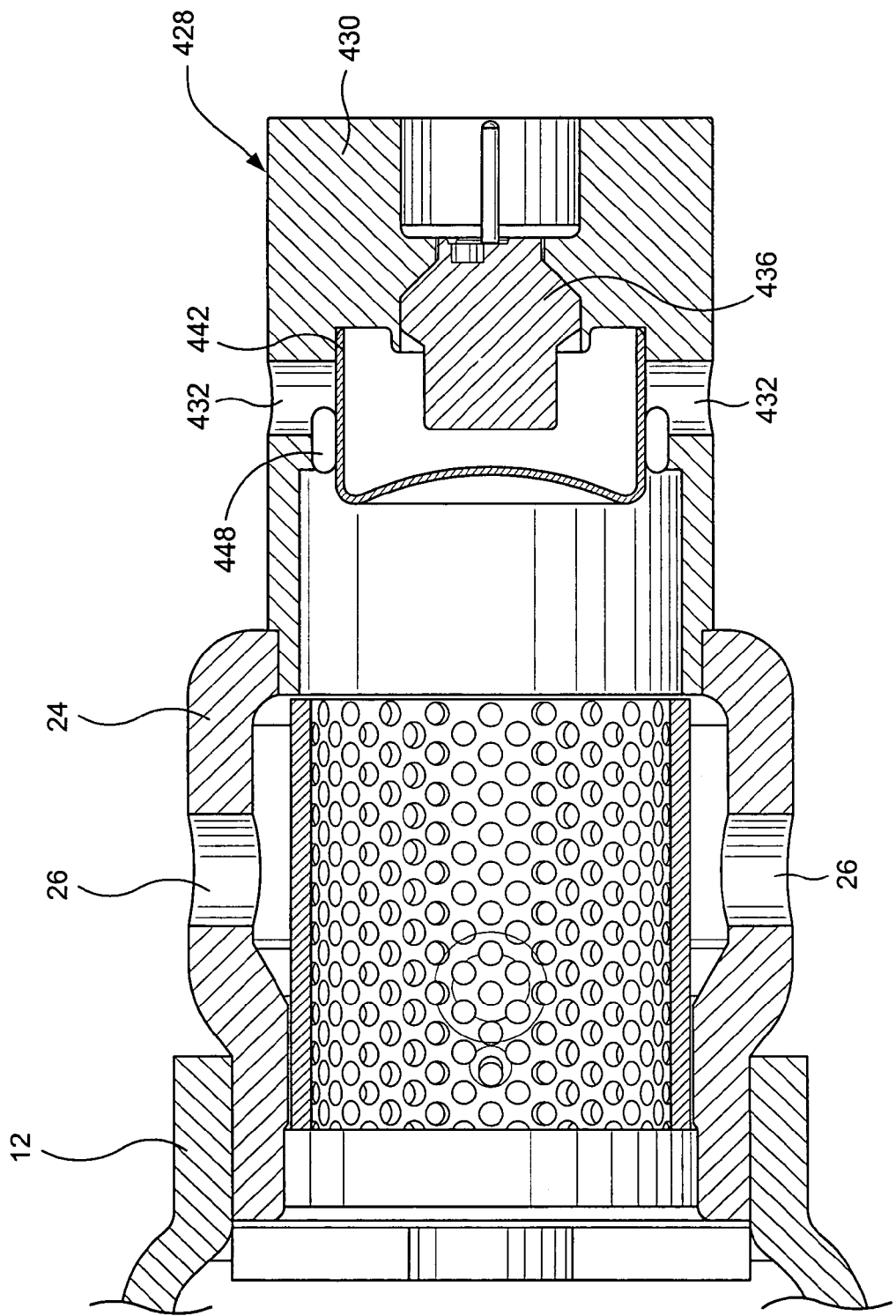
FIG. 5a is a side elevational view, with parts broken away and parts in section, of an exhaust manifold and a fourth embodiment of an adaptive valve having exhaust orifices that are normally closed to the inflation gas within the exhaust manifold.
Figure 5B:
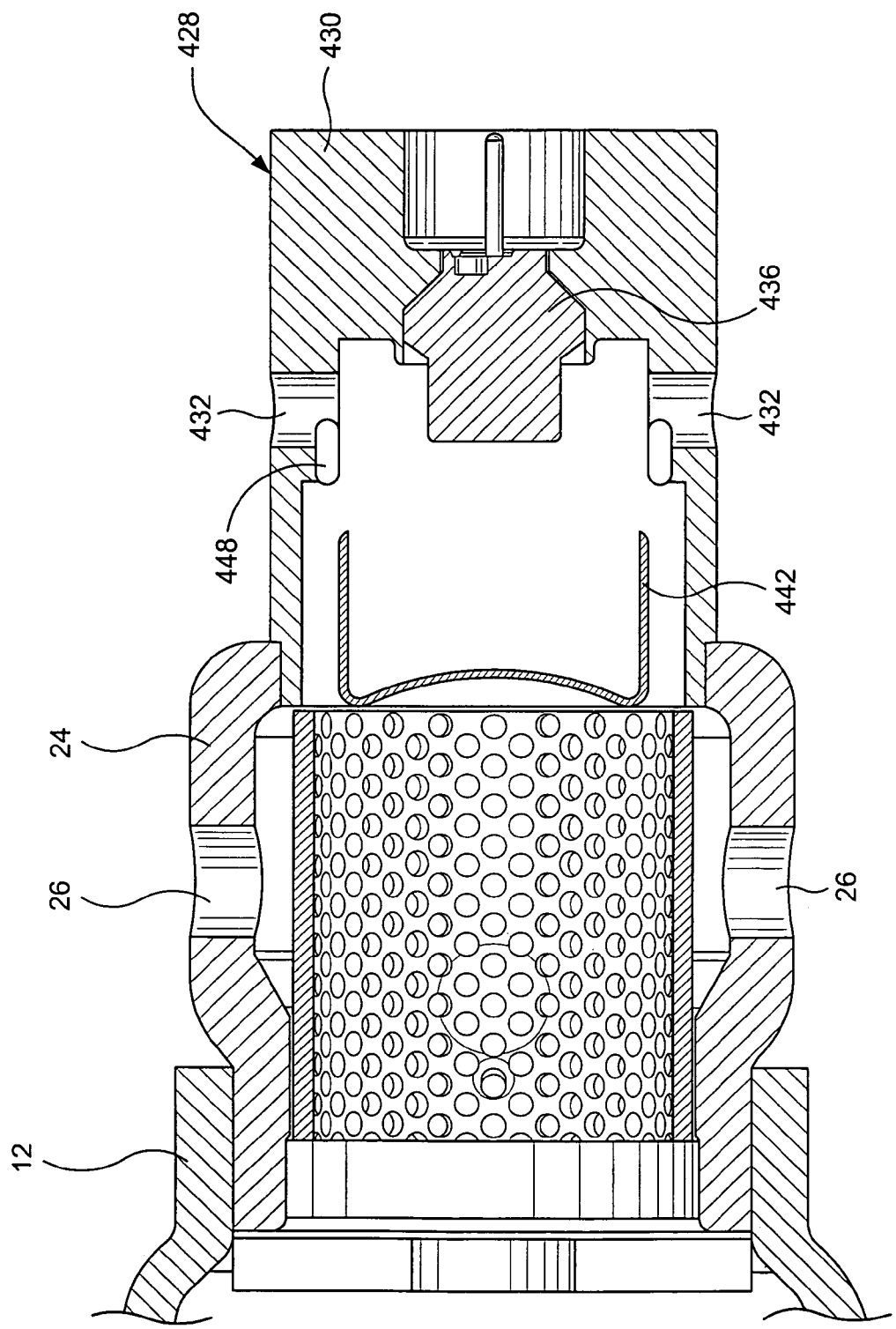
FIG. 5b is a side elevational view similar to FIG. 5a showing the adaptive valve with the exhaust orifices open to the inflation gas.

FIGS. 5*a* and 5*b* disclose a fourth embodiment of an adaptive valve 428 which is of the reverse logic type that is in a normally closed position to provide for a high rate of inflation of the airbag. In this embodiment, the adaptive valve 428 comprises a valve body 430 having a plurality of exhaust orifices 432 therein which are normally closed by a cup-shaped valve member 442 that is removably retained in the closed position shown in FIG. 5*a* by a seal or ring member 448.

When the adaptive valve 428 is in the closed position shown in FIG. 5*a*, pressurized inflation gas flows from the pressure vessel 12 into the exhaust manifold 24 and out of the exhaust manifold openings 26 into the airbag (not shown) without any gas being diverted through the valve exhaust orifices 432. The activation of the valve initiator 436 will create sufficient gas pressure to move the valve member 442 to the open position shown in FIG. 5*b* wherein the valve exhaust orifices 432 are opened and some of the pressurized inflation gas in the exhaust manifold 24 is diverted through the exhaust valve orifices 432 away from the manifold and the airbag (not shown) to reduce the rate of inflation of the airbag.

Figure 6:
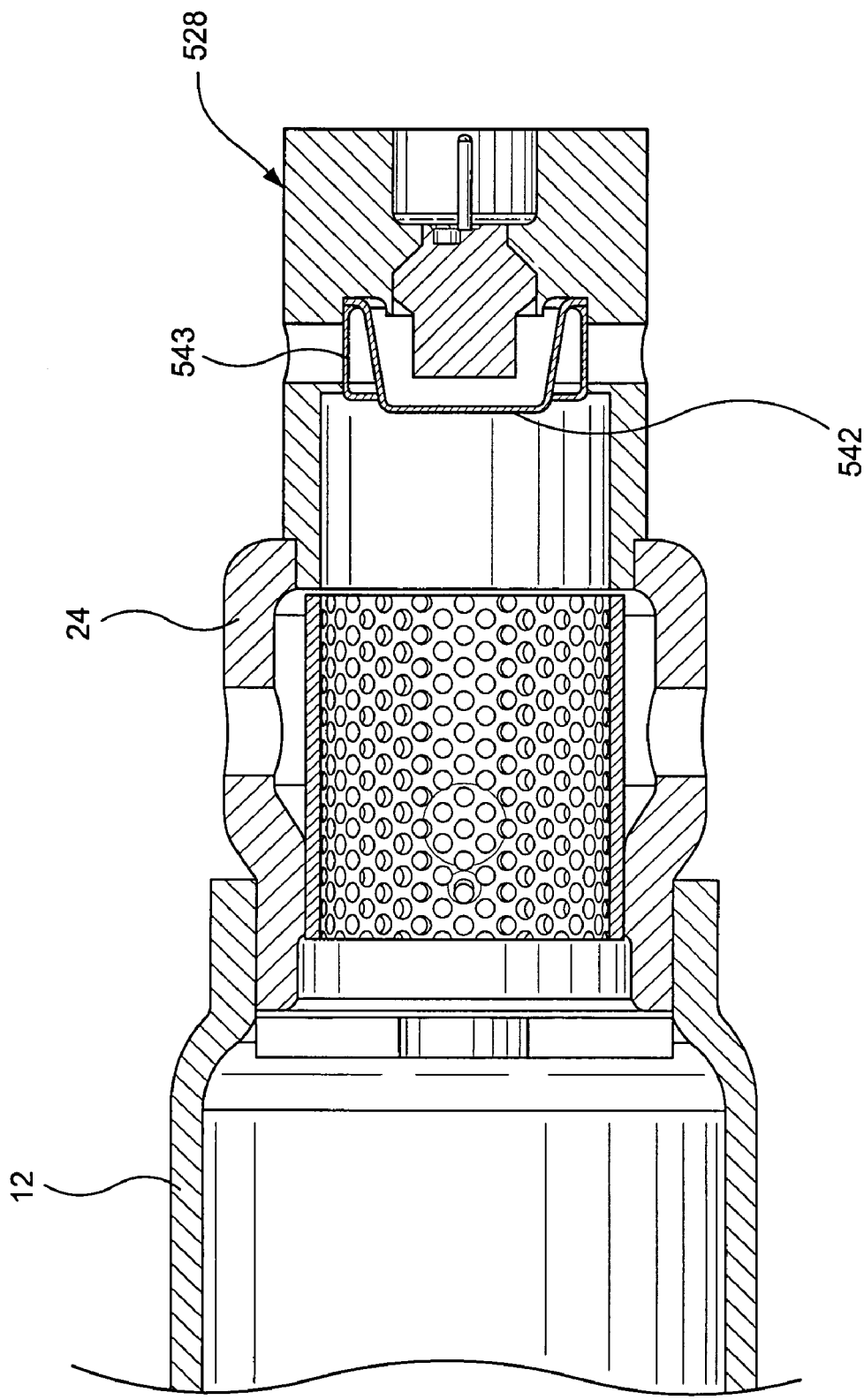
FIG. 6 is a side elevational view similar to FIG. 5a showing a fifth embodiment of an adaptive valve having exhaust openings that are normally closed to the inflation gas within the exhaust manifold.

The valve member 442 may be of any suitable cup-shaped configuration. FIG. 6 discloses an alternate configuration wherein the valve member 542 is cup-shaped and is provided with an outer circumferential flexible and resilient flange portion 543 that removably retains it in the closed position shown in FIG. 6. Other than the valve member 542, the adaptive valve 528 and the exhaust manifold 24 shown in FIG. 6 are the same as those shown in FIGS. 5*a* and 5*b*.

From the foregoing description, it will be readily seen that the adaptive valve embodiments of the present invention are simple in construction and reliable in operation to provide for selective increase or decrease in the rate of inflation of an airbag. Since the adaptive valve is located downstream of the inflator control orifice, the internal operating pressure of the inflator is not affected by the operation of the adaptive valve. Because the internal operating pressure of the inflator is unaffected, the variation between inflators is reduced when compared with those wherein the operating pressure is varied with changes in output levels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. An airbag inflator comprising:
   a pressure vessel having a control orifice through which inflation gas may flow when it reaches a predetermined pressure within said pressure vessel;
   a manifold connected to said pressure vessel in fluid communication with said control orifice, said manifold comprising an exhaust opening through which inflation gas from said pressure vessel may pass for inflation of an airbag; and
   an adaptive valve connected to said manifold, said adaptive valve being in fluid communication with said manifold and comprising an exhaust orifice for diverting inflation gas to an area outside of an airbag in communication with said manifold exhaust opening to lower the inflation rate thereof, and a valve member movably mounted in said adaptive valve for selective movement between a first position wherein it closes said exhaust orifice and a second position wherein it opens said exhaust orifice, wherein said adaptive valve further comprises an initiator that can be actuated to generate sufficient gas pressure to move said valve member to said first or second position, and said valve member is normally in said second position, and said initiator can be actuated to move said valve member to said first position.

2. The airbag inflator of claim 1 wherein a rupture disk is positioned over said control orifice and is rupturable to open said control orifice when the inflation gas in said pressure vessel reaches said predetermined pressure.

3. The airbag inflator of claim 1 wherein said adaptive valve further comprises an initiator that can be actuated to generate sufficient gas pressure to move said valve member to said first or second position.

4. The airbag inflator of claim 1 wherein said manifold comprises a plurality of radial exhaust openings, and said adaptive valve comprises a plurality of radial exhaust orifices.

5. The airbag inflator of claim 1 wherein said adaptive valve comprises a generally cylindrical valve body, and said valve member is of generally cylindrical cup-shaped configuration and is slidably mounted in said valve body, said valve member having a weakened central portion that is supported in said second position by a plug that is positioned in a support tube that surrounds an inner portion of said initiator so that said plug is in fluid communication with said initiator, said valve member having a radial opening that is in alignment with said exhaust orifice when in said second position, whereby upon actuation of said initiator the pressurized gas generated thereby moves said plug through the weakened central portion of said valve member to enable it to be moved by inflation gas under pressure from said manifold to said first position by slidable movement along said valve body and said support tube.

6. The airbag inflator of claim 5 wherein said valve body has an air vent disposed between said initiator and said valve member when in said second position to allow air to be displaced from said valve body as said valve member is moved to said first position to facilitate the movement thereof.

7. The air bag inflator of claim 1 wherein said manifold has an inner end connected to said pressure vessel, said manifold has an outer end, and said adaptive valve is connected to the outer end of said manifold.

8. An adaptive valve for an airbag inflator having a manifold with an exhaust opening for fluid communication with an airbag, said adaptive valve being constructed for connection to a manifold so that it is in fluid communication therewith, said adaptive valve having an exhaust orifice and being constructed to selectively open said exhaust orifice to divert inflation gas away from an inflator manifold when it is connected thereto to lower the rate of inflation of an airbag in fluid communication with the exhaust opening of the manifold, further comprising a valve member movably mounted therein for movement between a first position wherein it closes said exhaust orifice and a second position wherein it opens said exhaust orifice, further comprising an initiator that can be actuated to generate sufficient gas pressure to move said valve member to said first or second position, wherein said valve member is normally in said second position, and said initiator can be actuated to move said valve member to said first position.

9. The adaptive valve of claim 8 wherein said adaptive valve has a valve body with said exhaust orifice therein, said valve body having an open inner end for connection to an inflator manifold, a rupture disk closing said open end of said valve body, and an initiator disposed within said valve body and being operable to generate sufficient gas pressure in said valve body to rupture and open said rupture disk so that inflation gas from an inflator manifold can flow through the open inner end of said valve body to said exhaust orifice.

10. The adaptive valve of claim 9 wherein a support tube is disposed within said valve body and has an inner end in engagement with said rupture disk to support said disk, said support tube having an outer end in fluid communication with said initiator.

11. An airbag inflator comprising:
a pressure vessel having a control orifice through which inflation gas may flow when it reaches a predetermined pressure within said pressure vessel;
a manifold connected to said pressure vessel in fluid communication with said control orifice, said manifold comprising an exhaust opening through which inflation gas from said pressure vessel may pass for inflation of an airbag; and
an adaptive valve connected to said manifold, said adaptive valve being in fluid communication with said manifold and comprising an exhaust orifice for diverting inflation gas to an area outside of an airbag in communication with said manifold exhaust opening to lower the inflation rate thereof, and a valve member movably mounted in said adaptive valve for selective movement between a first position wherein it closes said exhaust orifice and a second position wherein it opens said exhaust orifice;
wherein said adaptive valve further comprises an initiator that can be actuated to generate sufficient gas pressure to move said valve member to said first or second position;
wherein said valve member is normally in said first position, and said initiator can be actuated to move said valve member to said second position;
wherein said adaptive valve comprises a generally cylindrical valve body, and said valve member is of generally cylindrical cup-shaped configuration and is slidably mounted in said valve body, said valve member having a weakened central portion that is supported in said first position by a plug that is positioned in a support tube that surrounds an inner portion of said initiator so that said plug is in fluid communication with said initiator, whereby upon actuation of said initiator the pressurized gas generated thereby moves said plug through the weakened central portion of said valve member to enable it to be moved by inflation gas under pressure from said manifold to said second position by slidable movement along said valve body and said support tube.

12. The airbag inflator of claim 11 wherein said valve body has an air vent disposed between said initiator and said valve member when in said first position to allow air to be displaced from said valve body as said valve member is moved to said second position to facilitate the movement thereof.

13. An airbag inflator comprising:
a pressure vessel having a control orifice through which inflation gas may flow when it reaches a predetermined pressure within said pressure vessel;
a manifold connected to said pressure vessel in fluid communication with said control orifice, said manifold comprising an exhaust opening through which inflation gas from said pressure vessel may pass for inflation of an airbag; and
an adaptive valve connected to said manifold, said adaptive valve being in fluid communication with said manifold and comprising an exhaust orifice for diverting inflation gas to an area outside of an airbag in communication with said manifold exhaust opening to lower the inflation rate thereof, and a valve member movably mounted in said adaptive valve for selective movement between a first position wherein it closes said exhaust orifice and a second position wherein it opens said exhaust orifice;
wherein said adaptive valve further comprises an initiator that can be actuated to generate sufficient gas pressure to move said valve member to said first or second position;
wherein said valve member is normally in said first position, and said initiator can be actuated to move said valve member to said second position;
wherein said adaptive valve comprises a generally cylindrical valve body, and said valve member is of generally cylindrical cup-shaped configuration and is slidably mounted in said valve body, said valve member having a weakened central portion that is supported in said first position by a support tube that surrounds an inner portion of said initiator and is in fluid communication therewith, whereby upon actuation of said initiator the pressurized gas generated thereby causes said central weakened portion to open to enable said valve member to be moved by inflation gas under pressure from said manifold to said second position by slidable movement along said valve body and said support tube.

14. The airbag inflator of claim 13 wherein said valve body has an air vent disposed between said initiator and said valve member when in said first position to allow air to be displaced from said valve body as said valve member is moved to said second position to facilitate the movement thereof.

* * * * *